(12) United States Patent
Rosich et al.

(10) Patent No.: US 6,263,094 B1
(45) Date of Patent: Jul. 17, 2001

(54) ACOUSTIC DATA ACQUISITION/PLAYBACK SYSTEM AND METHOD

(75) Inventors: Douglas Rosich, Reading, MA (US); Thomas J Hunt, Pelham; Laurent Belanger, Hudson, both of NH (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/285,831

(22) Filed: Apr. 2, 1999

(51) Int. Cl.$^7$ ........................................ G06K 9/00
(52) U.S. Cl. ............................................ 382/128
(58) Field of Search ................... 382/128, 131; 128/915, 916; 702/33, 39, 159, 171; 600/407, 437; 345/158; 348/162, 163; 601/2; 604/22; 73/1.82, 570.5, 861.18, 861.25, 861.26, 861.27, 514.28; 708/815; 369/86

(56) References Cited

U.S. PATENT DOCUMENTS

| | | | |
|---|---|---|---|
| 4,167,753 | * 9/1979 | Lynk ...................... | 348/442 |
| 5,016,641 | * 5/1991 | Schwartz ................ | 600/455 |
| 5,329,929 | * 7/1994 | Sato et al. .............. | 600/441 |
| 5,373,848 | * 12/1994 | Melton, Jr. et al. ..... | 600/455 |
| 5,388,079 | * 2/1995 | Kim et al. ............... | 367/103 |
| 6,149,597 | * 11/2000 | Kamiyama .............. | 600/458 |
| 6,171,244 | * 1/2001 | Finger et al. ........... | 600/437 |

* cited by examiner

Primary Examiner—Andrew W. Johns
Assistant Examiner—Shervin Nakhjavan

(57) ABSTRACT

An acoustic data acquisition/playback system and method enable acquisition of acoustic data from an ultrasound imaging system and subsequent substantially real time playback of the acoustic data in the same system or a different system. Acoustic data is acquired at a particular data rate from a signal processing pipeline associated with the ultrasound imaging system during an image acquisition session wherein the acoustic data is produced by exposing a body to ultrasound signals. The acquired data is preferably acquired early in the pipeline so that it is completely raw (e.g., RF, IP, pre-beamformed, post-beamformed, pre-video, etc.), but it could be partially processed. Raw data or near raw data allows for greater flexibility in later signal processing. The acoustic data is stored during the session in a nonvolatile memory, which can optionally be removable. Next, at a time after the image acquisition session, the acoustic data is introduced into a signal processing system (the same ultrasound imaging system or a different signal processing system altogether) from the nonvolatile memory at least at the date rate that it was acquired, in order to produce a real time image for a reviewer that can be modified by the reviewer by further processing, if desired.

20 Claims, 5 Drawing Sheets

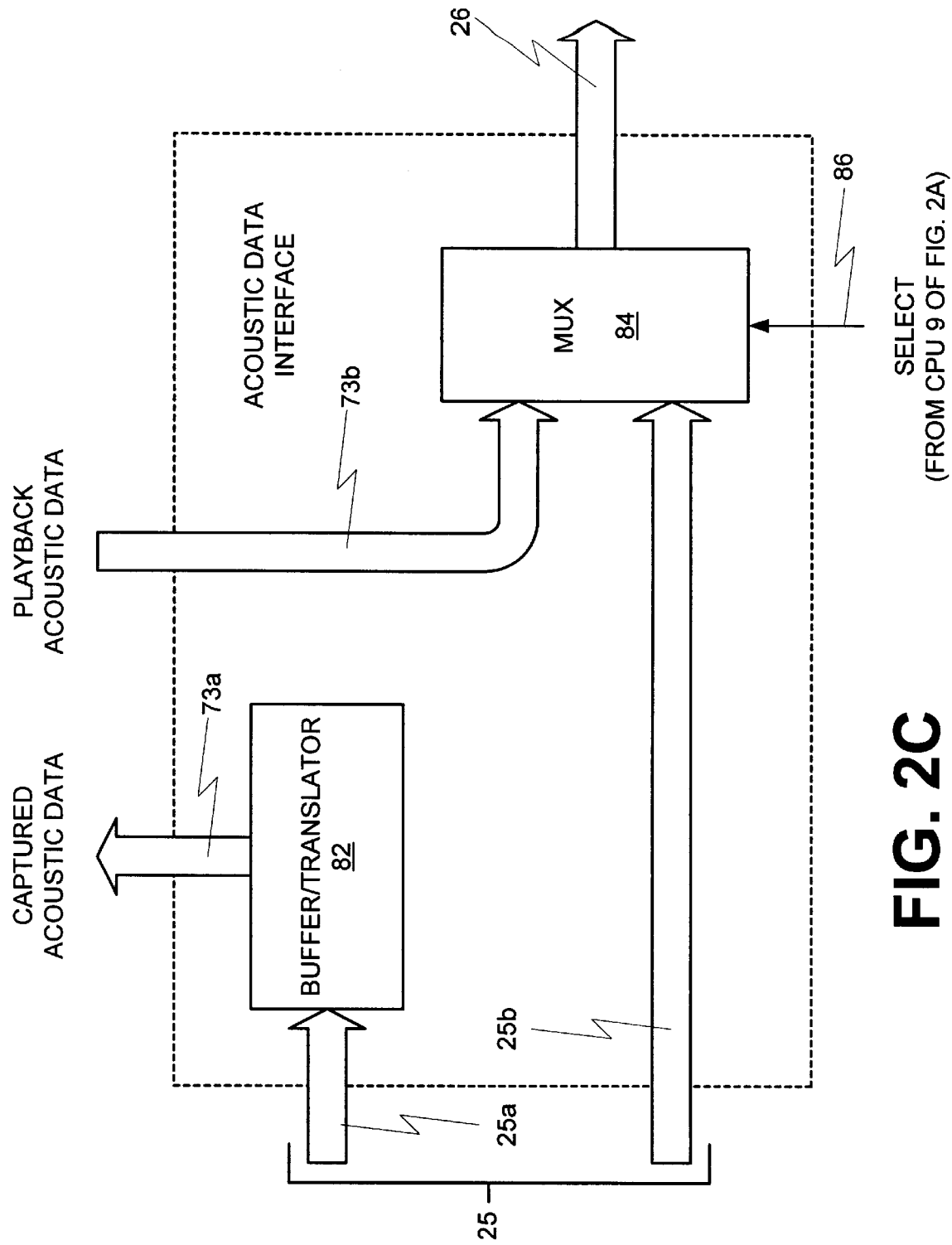

ACOUSTIC DATA ACQUISITION/PLAYBACK SYSTEM AND METHOD

FIELD OF THE INVENTION

The present invention generally relates to ultrasound imaging systems, and more particularly, to an acoustic data acquisition/playback system and method for capturing raw acoustic data, at any stage of processing along a signal processing pipeline associated with the ultrasound imaging system (preferably before the data is substantially modified), and allowing subsequent substantially real time (as if the imaged body were present) playback and manipulation of images during playback.

BACKGROUND OF THE INVENTION

Typically, when an ultrasound imaging system is used in a medical application for imaging a patient's body, the ultrasound imaging system is operated by a medical technician to acquire and record (e.g., tape) pertinent images of the body, while the doctor is not present to provide input as to the control settings of the system. Then, at a later time, the images are reviewed by the doctor who diagnoses the patient. The images are usually stored by the ultrasound imaging system as a video signal, or after the acoustic data has been fully processed and compressed by various signal processing stages and has reached the video stage within the signal processing pipeline associated with the ultrasound imaging system. The video signal is essentially comprised of a single or multiple planes of black and white picture elements (pixels) and/or color pixels.

A significant limitation of the foregoing methodology is that much of the information associated with the original ultrasound signal is not preserved, as the acoustic data has been processed by various mechanisms, such as filters, mixers, nonlinear transformations, compression mechanisms, etc., along the signal processing pipeline. Thus, when the images are reviewed, no additional or alternative signal processing may be performed upon the images by the doctor, and the patient is typically not available for more imaging sessions with the doctor.

An example of a commercially available ultrasound imaging system that generally employs the foregoing methodology is the Vingmed SD 100/200, which is a doppler-type system that is manufactured by Vingmed Corporation, U.S.A. The Vingmed SD 100/200 contains a frequency modulated (FM) video store capability, which provides for the storage and playback of baseband doppler audio. This signal, in the audio domain, is arguably analogous to visual information in the video domain. In other words, the stored signal is in the post-processed format, or the format in which it is presented to the user. Raw acoustic data is not preserved, and thus, additional and alternative signal processing of the ultrasound data cannot be performed. Only the stored baseband audio signal is available to the replay device.

Another example of a commercially available ultrasound imaging system is the SONOS™ 5500, which is manufactured by the Hewlett-Packard Company, USA. Hewlett-Packard's SONOS 5500 provides a slow motion video feature, called the "acoustic quick review" or just "quick review," which can review acoustic data in slow motion from the SONOS 5500 system. However, the information is stored to non-volatile memory as video pixel data, and is injected back into the system at the video stage of the system, which does not permit additional or alternate signal processing to be performed on the image data.

Thus, there is a heretofore unaddressed need in the industry for a better way to acquire and play back ultrasound images.

SUMMARY OF THE INVENTION

The present invention provides an acoustic data acquisition/playback system and method for enabling acquisition of acoustic data from an ultrasound imaging system and subsequent substantially real time playback of the acoustic data.

In general, the method of the present invention can be broadly summarized as follows. Acoustic data is acquired at a particular data rate from a signal processing pipeline associated with an ultrasound imaging system during an image acquisition session wherein the acoustic data is produced by exposing a body to ultrasound signals. The acquired data is preferably acquired early in the pipeline so that it is completely raw, but it could be partially processed. Raw data or near raw data allows for later signal processing. The acoustic data is stored during the session in a nonvolatile memory, which can optionally be removable. Next, at a time after the image acquisition session, the acoustic data is introduced into a signal processing system (the same ultrasound imaging system or a different system) from the nonvolatile memory at approximately the particular rate that the data was acquired or at a higher data rate, in order to produce an image in real time for a reviewer that can be modified by the reviewer by further selective processing, if desired.

In architecture, the system includes an interface having an input and an output. The input and output are connectable to a signal processing pipeline associated with the ultrasound imaging system (or a different reviewing system) at essentially any point along the pipeline after the digital-to-analog conversion and prior to the conversion to video pixel data. The system also includes a nonvolatile memory, which can optionally be removable, for storing the acquired data. Finally, a controller, for example, a processor operating pursuant to software in the system, which is in electrical communication with the interface and the nonvolatile memory, is designed to selectively control the interface to acquire ultrasound data samples via the input and store the data samples in the nonvolatile memory. A suitable graphical user interface or other input scheme may be implemented to permit a user to advise the controller as to which data to acquire on a display screen, during the imaging session.

For playback, the controller can read the ultrasound samples from the nonvolatile memory and communicate the ultrasound samples to the output of the interface at approximately the same or greater than the data rate that the data was acquired at the input of the interface. The output can be connected to the same acquiring system or to another system for permitting review and processing of the acoustic data. Alternatively, the system may be provided with a removable nonvolatile memory for transporting the acquired acoustic data from one system to another.

An advantage of the invention is that it allows real time playback of previously acquired acoustic data, enabling a reviewer, such as a doctor, to selectively perform additional and/or alternative signal processing upon the acoustic data at a later time.

Another advantage of the invention is that it permits re-injection of raw or partially processed acoustic data (e.g., RF, IF, pre-video, etc.) into the signal processing pipeline of the ultrasound imaging system that acquired the acoustic data or into a separate different reviewing system, perhaps another ultrasound imaging system or merely a computer-based viewing system, which matches or exceeds the processing capability of the acquiring system.

Another advantage of the invention is that when the acoustic data is reinjected, the data rate is at or near the actual rate at which the data was acquired. This effectively simulates the presence of the insonified target. It allows the reviewer of the ultrasound data to change and manipulate the signal processing parameters which the acquiring system can change, and to see the results in real time, as if the insonified target was a source of the data, instead of the storage device.

Other features and advantages of the invention will become apparent to one with skill in the art upon examination of the following drawings and detailed description. These additional features and advantages are intended to be included herein within this description and protected by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Finally, graphs are shown schematically for simplicity.

FIG. 2C is a block diagram of a possible specific implementation of the acoustic data interface of FIG. 2B.

DETAILED DESCRIPTION OF THE PREFERRED EMBODIMENT

Figure 1:
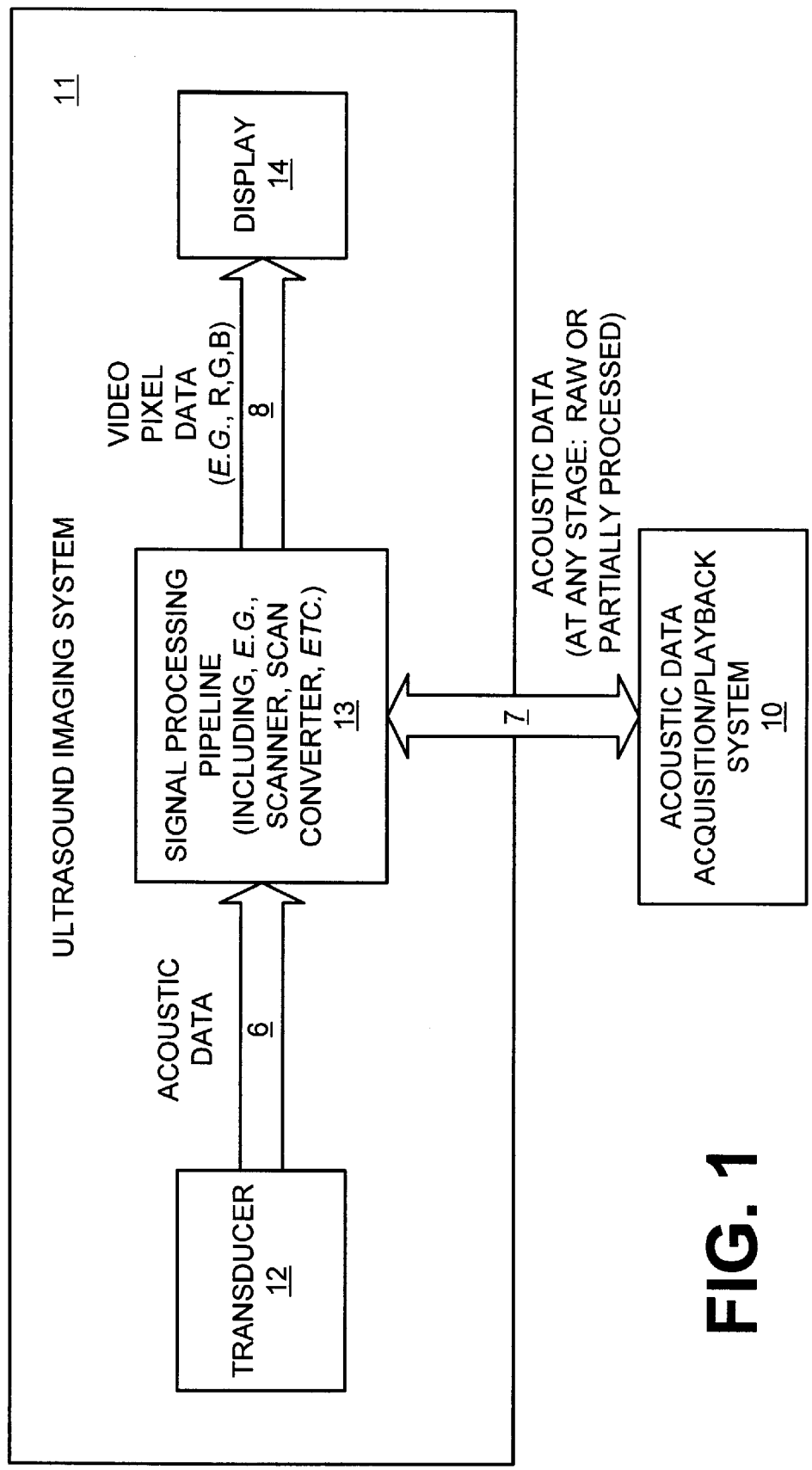
FIG. 1 is a block diagram of the acoustic data acquisition/playback system in accordance with the present invention, which is interconnected with an ultrasound imaging system.

FIG. 1 is an electrical block diagram showing the acoustic data acquisition/playback system 10 of the present invention interconnected with an ultrasound imaging system 11, which can be virtually any type of ultrasound imaging system, for example but not limited to, a brightness-mode (B-mode) system, a doppler-based imaging system, a color flow imaging system, etc., as well as a conventional or custom manufactured ultrasound imaging system. In architecture, as illustrated in FIG. 1, the ultrasound imaging system 11 includes a transducer 12 for emitting and receiving ultrasound signals and for acquiring acoustic data 6 for analysis, a signal processing pipeline 13 in electrical communication with the transducer 12 for processing (e.g., filtering, mixing, translating, etc.) and analyzing the acoustic data 6, and a display 14 in electrical communication with the signal processing pipeline 13 for displaying video picture element (pixel) data 8, for example, tri-color R, G, B pixel data, to a user of the system 11. In accordance with the present invention, the acoustic data acquisition/playback system 10 is electrically interfaced with the ultrasound imaging system 11 at some point along the signal processing pipeline 13 to enable the acoustic data acquisition/playback system 10 to capture completely raw acoustic data or partially processed acoustic data, denoted by bidirectional reference numeral 7, for later re-injection and real time playback that allows for additional and/or alternative signal processing by the reviewer, if desired. Physically, the acoustic data acquisition/playback system 10 can be constructed as an integral part of or separable part of the ultrasound imaging system 11.

Specific examples of acoustic data along the pipeline 13 that can be acquired and re-injected are as follows (nonexhaustive list): completely raw data just after an analog-to-digital conversion; prebeamformed RF data prior to processing by a beamformer; RF intermediately beamformed data; RF filtered data; mixed baseband data, IF data; post-beamformed data, amplitude detected data, post-log data, pre-log data, post-log filtered data, polar coordinate data (R, Theta); orthogonal coordinate data (x, y or x, y, z); and scan converted data that has not yet been processed to video pixel data.

The acoustic data acquisition/playback system 10 is designed to inject the acoustic data back into the same ultrasound imaging system 11 or into a different viewing device or system (which could be another ultrasound imaging system, for example), which matches or exceeds the processing capability of the acquiring system 11. During injection of the acoustic data 7, the data rate is approximately at or higher than the actual rate at which the acoustic data 7 was acquired. As a result, the presence of the insonified target is effectively simulated at the display 14. This feature allows the reviewer of the ultrasound data to change and manipulate the signal processing parameters that the acquiring system 11 was capable of changing, and see the results in real time, as if the insonified target was the source of the acoustic data, not a storage device.

The acoustic data acquisition/playback system 10 permits a reviewer of images to adjust at least the following nonexhaustive list of processing parameters while reviewing images, despite the fact that the imaged body may no longer be present or available:

(a) linear transformation parameters, including gain, filtering, and mixing;

(b) non-linear transformation parameters, including logarithm translation;

(c) adaptive signal processing parameters;

(d) two-dimensional (2D) and three-dimensional (3D) amplitude and phase image detection parameters;

(e) post 2D and 3D image detection processing parameters, including linear, non-linear, and adaptive transformations, boundary detection, and object recognition;

(f) four-dimensional (4D) image detection processing parameters, i.e., tracking parameters of boundaries and objects through time;

(g) parameters associated with detection of velocities for presentation as color flow data;

(h) parameters associated with post-color flow velocity detection signal processing, including linear, non-linear, and adaptive transformations with color flow velocity data, as well as boundary, and object recognition of color flow signatures; and (i) parameters associated with detection of velocities for presentation as baseband doppler spectral data or baseband audio data. In the context of this document, "processing" data means performing one or more of the foregoing operations, or functions, upon the data, including specifically but not limited to those operations shown in the blocks of the block diagram of FIG. 2A.

Figure 2A:
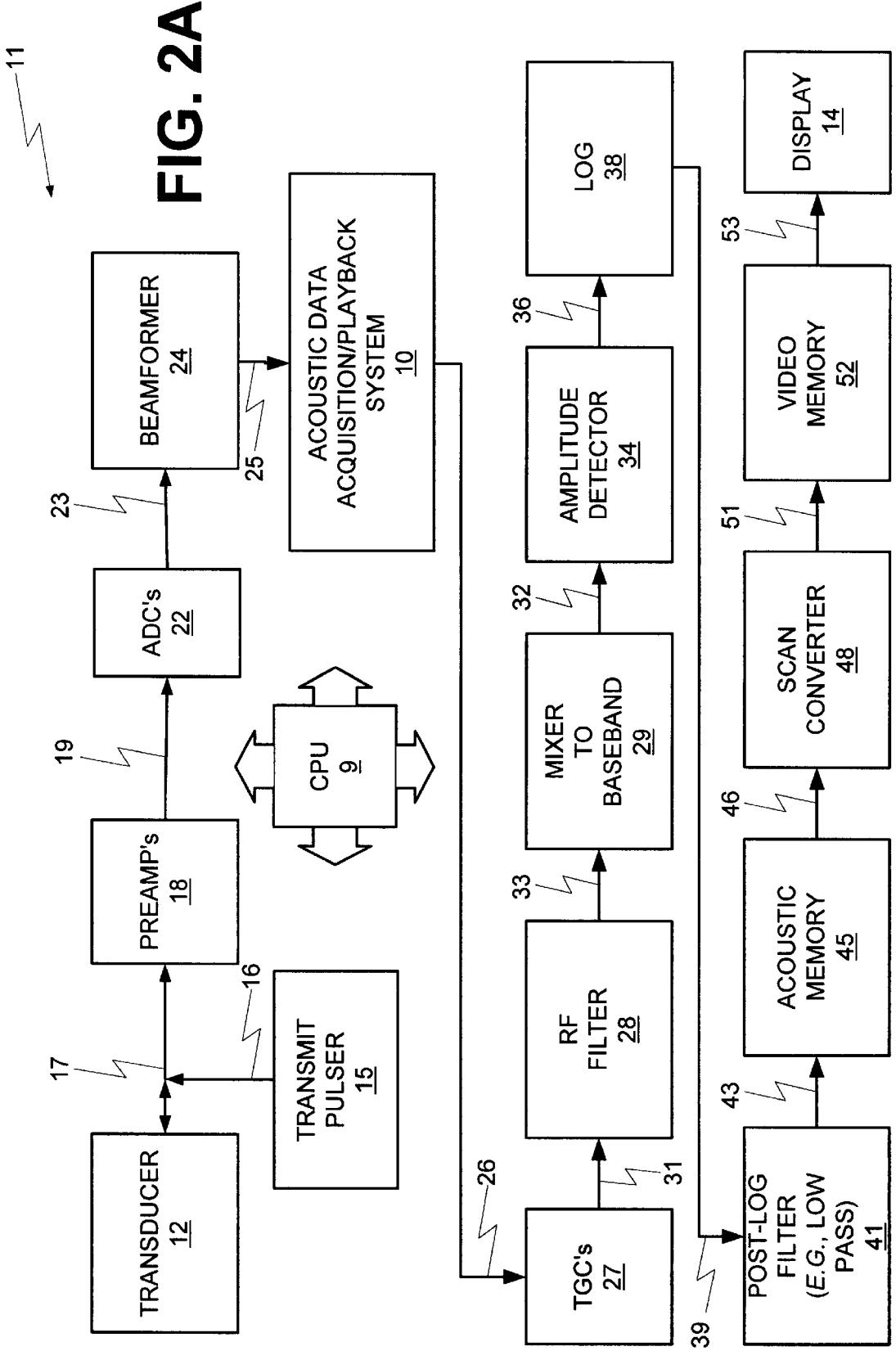
FIG. 2A is a block diagram of a possible specific implementation of the ultrasound imaging system of FIG. 1.

A detailed block diagram of a possible example of a specific implementation of the ultrasound imaging system 11, as interconnected with the acoustic data acquisition/playback system 10, is shown in FIG. 2A. The acoustic data acquisition/playback system 10 of the present invention will be specifically described in detail in the context of an ultrasound imaging system 11 that creates and displays brightness mode (B-Mode) images, or gray-scale images, which are well known in the art, as a nonlimiting example.

Each block of FIG. 1 defines a logical function that can be implemented in hardware, software, or a combination thereof. For purposes of achieving high speed, it is preferred, at present, that most of the blocks be implemented in hardware, unless specifically noted hereafter. The ultrasound imaging system 11 includes a conventional central processing unit (CPU) 11 designed to control the operation and timing of the various elements and data flow of the system 11 pursuant to suitable software (not shown for simplicity).

The ultrasound imaging system 11 further includes an ultrasonic transducer 12 configured to emit and receive ultrasound signals, or acoustic energy, respectively to and from an object under test (e.g., a body or a patient when the ultrasound imaging system 11 is used in the context of a medical application). Many types of transducers 12 are known in the art and are suited for use in connection with the present invention.

In the preferred embodiment, the transducer 12 comprises an array of elements typically made of a piezoelectric material, for example but not limited to, crystal. Each element is voltage biased and supplied with an electrical pulse or other suitable electrical waveform, causing the elements to collectively propagate an ultrasound pressure wave into the object under test. Moreover, in response thereto, one or more echoes are emitted by the object under test and are received by the transducer 12, which transforms the echoes into an electrical signal for further processing.

The array of elements associated with the transducer 13 enable a beam, emanating from the transducer array, to be steered (during transmit and receive modes) through the object by shifting the phase (introducing a time delay) of the electrical pulses/biasing signals supplied to the separate elements. During transmit, an analog waveform is communicated to each transducer element, thereby causing a pulse to be selectively propagated in a particular direction, like a beam, through the object.

During the receive mode, an analog waveform is received at each transducer element at each beam position. Each analog waveform essentially represents a succession of echoes received by the transducer element over a period of time as echoes are received along the single beam through the object. The entire set of analog waveforms represents an acoustic line, and the entire set of acoustic lines represents a single view, or image, of an object and is referred to as a frame.

A transmit pulser 15 is electrically connected to the transducer and generates electrical pulses 16 that are periodically communicated to the array of elements of the transducer 12, causing the transducer elements to emit ultrasound signals into the object under test of the nature described previously. The transmit pulser 15 typically provides separation between the pulse transmissions to enable the transducer 12 to receive echoes from the object during the period therebetween and forwards them onto a set of parallel analog preamplifiers 18.

The plurality of preamplifiers 18 receives analog electrical echo waveforms 17 from the transducer 12 that are generated by echoes emitted from the object under test. More specifically, each preamplifier 18 receives an analog electrical echo waveform from a corresponding transducer element for each acoustic line. Moreover, the set of preamplifiers 18 receives a series of waveform sets, one set for each separate acoustic line, in succession over time and processes the waveforms in a pipeline processing manner. The set of preamplifiers 18 is configured to amplify the echo waveforms 17 to provide amplified echo waveforms 19 in order to enable further signal processing, as described hereafter. Because the ultrasound signals received by the transducer 12 are of low power, the set of preamplifiers 18 should be of sufficient quality that excessive noise is not generated in the process.

A plurality of parallel analog-to-digital converters (ADC) 22 are connected respectively to the plurality of preamplifiers 18, as shown in FIG. 1. Each of the ADCs 22 is configured to convert its respective analog echo waveform 19 into a digital echo waveform 23 comprising a number of discrete location points (hundreds to thousands; corresponds with depth and may be a function of ultrasound transmit frequency) with respective quantized instantaneous signal levels, as is well known in the art. In previous prior art ultrasound imaging systems, this conversion often occurred later in the signal processing steps, but now, many of the logical functions that are performed on the ultrasonic signals can be digital, and hence, the conversion is preferred at an early stage in the signal processing process. The plurality of ADCs 22 receive a series of waveforms for separate acoustic lines in succession over time and processes the data in a pipeline processing manner. As an example, the system may process signals at a clock rate of 40 MHz with a B-mode frame rate of 100 Hz.

A beamformer 24 is connected to the ADCs 22 and is designed to receive the multiple digital echo waveforms 23 (corresponding with each transducer element) from the ADCs 22 and combine them to form a single acoustic line 26. To accomplish this task, the beamformer 24 delays the separate echo waveforms 23 by different amounts of time and then adds the delayed waveforms together, in order to create a composite digital RF acoustic line 26. The foregoing delay and sum beamforming process is well known in the art. Furthermore, the beamformer 24 receives a series of data collections for separate acoustic lines in succession over time and processes the data in a pipeline processing manner.

The acoustic data acquisition/playback system 10 is connected to the beamformer 24 to received the beamformed data 25. The system 10 is designed to capture a portion (denoted by reference numeral 96 in FIG. 3) of the beamformed acoustic data 25 for later re-injection and real time playback that allows for additional and/or alternative signal processing by the reviewer, if desired. The acoustic data acquisition/playback system 10 is designed to inject the acoustic data back into the ultrasound imaging system 11, specifically, into the TGC's 27, or into a different viewing device or system (which could be another ultrasound imaging system, for example), which matches or exceeds the processing capability of the acquiring system 11, through an optional exterior port situated on the system 10 or system 11. During injection of the acoustic data, the data rate is at or near the actual rate at which the acoustic data was acquired. Optionally, the acoustic data acquisition/playback system 10 may store the acquired acoustic data on a transportable nonvolatile memory, which can be read by another system for permitting the reviewing process. During playback, a reviewer can selectively process the acoustic data in any manner desired.

Because the echo waveforms typically decay in amplitude as they are received from progressively deeper depths in the object under test, the beamformed acoustic data 26 from the system 10 is passed through one or more time-gain compensators (TGCs) 27, which are known in the art and which are designed to progressively increase the gain during each acoustic line, thereby reducing the dynamic range requirements on subsequent processing stages.

A radio frequency (RF) filter 28 is connected to the acoustic data acquisition/playback system 10 and is configured to receive and process digital acoustic lines in succession. The RF filter 28 is configured to receive each digital acoustic line 26, to filter it using a bandpass filtering scheme, and to produce a filtered digital acoustic line 33.

A mixer 29 is connected to the RF filter 28, as illustrated, and is designed to process each digital acoustic line 33 in pipeline manner. The mixer 29 is configured to combine the filtered digital acoustic line 33 from the RF filter 28 with a local oscillator signal (not shown for simplicity) in order to ultimately produce a baseband digital acoustic line 32. Preferably, the local oscillator signal is a complex signal, having an in-phase signal (real) and a quadrature phase signal (imaginary) that are ninety degrees out of phase. The result of the operation produces sum and difference frequency signals. The sum frequency signal is filtered out, leaving the difference frequency signal, which is a complex signal at near zero frequency (near DC). A complex signal is desired in order to follow direction of movement of parts imaged in the object under test, and to allow accurate, wide bandwidth amplitude detection.

Up to this point in the receive processing, all operations can be considered substantially linear, so that the order of operations may be rearranged while maintaining substantially equivalent functionality. For example, in some systems it may be desirable to mix to a lower intermediate frequency (IF) or mix to baseband before beamforming or filtering. Such rearrangements of substantially linear processing functions are considered to be within the scope of this invention.

An amplitude detector 34 receives and processes, in pipeline manner, the complex baseband digital acoustic lines 32 from the mixer 29. For each, the amplitude detector 34 analyzes the envelope of the baseband digital acoustic line 32 to determine the magnitude of signal intensity at each point along the acoustic line and produces an amplitude-detected digital acoustic line 34. Mathematically, this means that the amplitude detector 34 determines the magnitude of each phasor (distance to origin) corresponding with each point along the acoustic line 32.

A log mechanism 38 receives the amplitude-detected digital acoustic lines 36, in pipeline processing manner, from the amplitude detector 34 and compresses the dynamic range of the data by computing the mathematical logarithm (log) of each line 36 to produce a compressed digital acoustic line 39 for further processing. Implementation of the log function enables a more realistic view, ultimately on the display, of the change in brightness corresponding to the ratio of echo intensities.

A post-log filter 41, usually a low-pass filter, is connected to the log mechanism 38 and is configured to receive the compressed digital acoustic lines 39 in pipeline fashion and to filter the high frequencies associated with the compressed digital acoustic lines 39. The primary purpose for the low-pass post-log filter 41 is to enhance the quality of the ultimate display image. Generally, the low-pass post-log filter 41 softens the speckle in the displayed image. The low-pass post-log filter 41 can also be configured to perform anti-aliasing. The low-pass filter 41 can be designed to essentially trade spatial resolution for gray-scale resolution.

An acoustic memory 45, preferably a suitable species of random access memory (RAM), receives the filtered digital acoustic lines 43 from the low-pass post-log filter 41. The acoustic memory 45 is configured to accumulate acoustic lines of data over time. The acoustic lines 43 can be defined within a two (2D) or three (3D) dimensional space, typically a 2D or 3D polar coordinate system, respectively. A scan converter 48 is connected to the acoustic memory 45 and is designed to convert the data 46 from the acoustic memory 45 from one coordinate system to another in order to produce pixels for display. The scan converter 48 processes the data in the acoustic memory 45 once an entire data frame (set of all acoustic lines in a single view, or image/picture to be displayed) has been accumulated by the acoustic memory 45. If two-dimensional (2D) data, then the acoustic memory 45 receives and stores 2D data, typically in defined in polar coordinates, and the scan converter 48 converts the 2D polar coordinate data into 2D rectangular (orthogonal) data capable of raster scan on a raster scan display. If three-dimensional (3D), then the scan conversion is more complicated. In this case, the acoustic memory 45 receives and stores 3D data, and the scan converter 48 renders and scan converts it, i.e., converts it into a 2D view from an appropriate vantage point that is capable of being raster scanned by a display. The scan converter 48 outputs picture elements (pixels) 51 for storage and/or display.

A video memory 52, also referred to conventionally as a frame buffer, stores the pixel data 51 from the scan converter 48. The video memory 52, typically a species of RAM, makes the data readily available to the display 14 for viewing by a user/operator.

The display 14 is preferably a conventional display device that is in electrical communication with the video memory and is configured to periodically retrieve the pixel data 51 from the video memory 52 and drive a suitable screen for viewing of the ultrasound image by a user/operator.

Figure 2B:
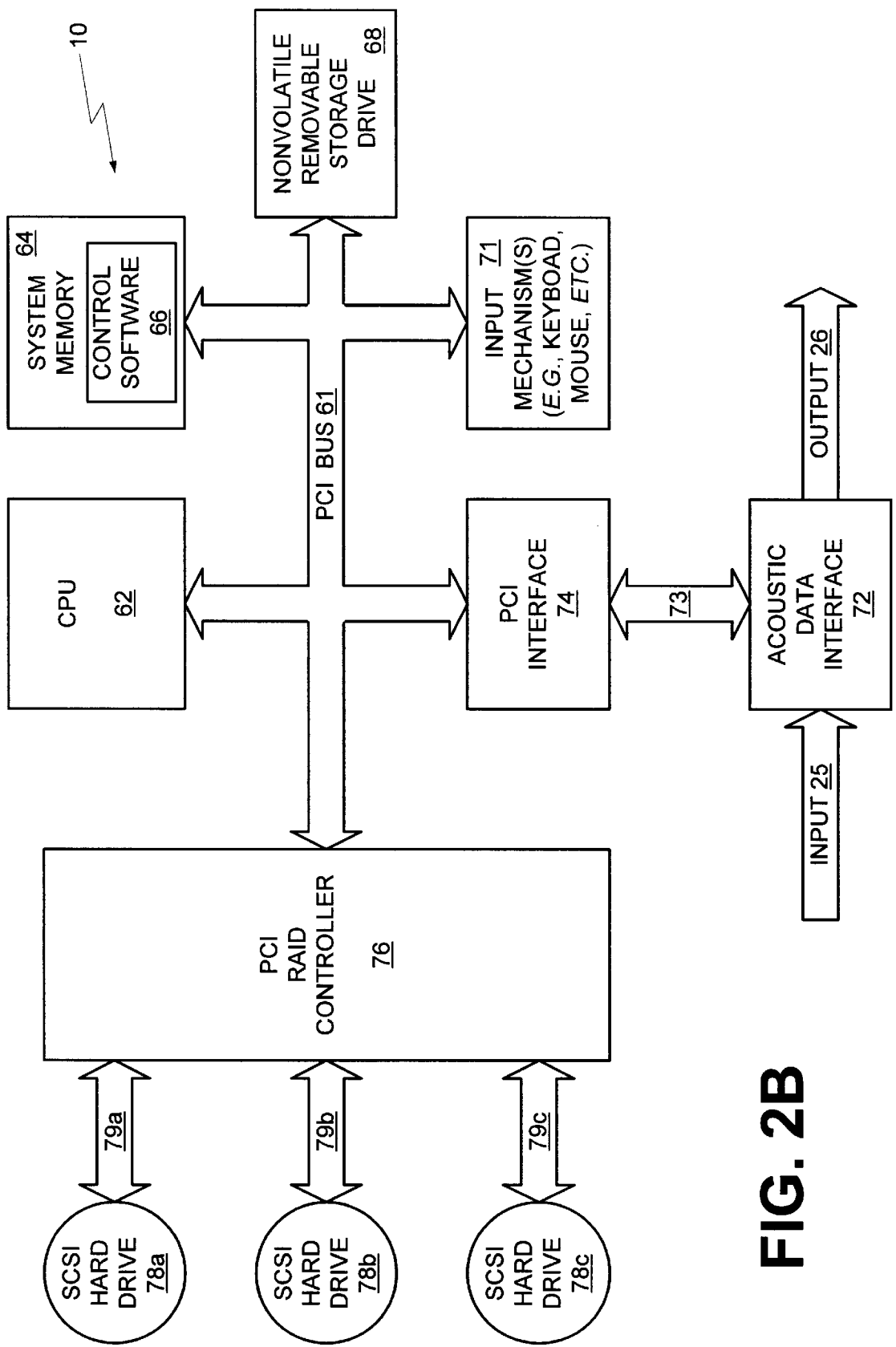
FIG. 2B is a block diagram of a possible specific implementation of the acoustic data acquisition/playback system of FIG. 2A.

An example of a possible specific implementation of the acoustic data acquisition/playback system 10 (FIGS. 1 and 2A) is shown by way of a block diagram in FIG. 2B. Referring to FIG. 2B, in this example, the acoustic data acquisition/playback system 10 is a high performance computer-based system that employs an industry-standard peripheral component interconnect (PCI) architecture. The components of the architecture, which will be described hereafter, have been selected to minimize cost and complexity, while maximizing performance.

More specifically, the system 10 employs a local interface in the form of a PCI bus 61, which interconnects the various elements of the system 10. A local central processing unit (CPU) 62 controls the various elements of the system 10 and executes the software and/or firmware of the system 10. A system memory 64, for example, a dynamic random access memory (DRAM), stores and makes available control software 66 that is executed by the CPU 62 for achieving the functionality as described herein. A nonvolatile removable storage drive, for example, a 100 Mbyte ZIP drive manufactured by and commercially available from Iomega, Inc., U.S.A., is connected to the PCI bus 61 to enable RF acoustic data to be removed from the system 10, if desired. An input mechanism 71, for example, a keyboard, mouse, etc., is connected to the PCI bus 61 for enabling, among other things, a user to define to the system 10 which data to capture on the display screen associated with the display 14 (FIG. 1) and for enabling a user to manipulate the aforementioned processing parameters during playback. An acoustic data interface 72 is connected to the PCI bus 61 by way of a PCI interface 74 and is designed to capture incoming acoustic data 25 for storage and to inject acoustic data into the system 11 or another reviewing system. A PCI RAID controller 76 is connected to the PCI bus 61 and is designed to control a plurality, such as three, of small computer system interface (SCSI) hard drives 78a–78c, each preferably 2 gigabytes in size, for storing acquired acoustic data 79a–79c, respectively.

Referring to FIG. 2B, the CPU 62, operating pursuant to the control software 66, causes at least the following digital sample point information to be stored in the set of SCSI hard drive 78a–78c: (a) a sample rate (and/or sample frequency) indicative of the spacing between samples of acoustic data; (b) for each sample: (1) an amplitude value; (2) a frame identifier, such as a frame number; and (3) an acoustic line identifier, such as an acoustic line number; (c) a start depth (and/or time) of each acoustic line and/or frame; and (d) a stop depth (and/or time) of each acoustic line and/or frame.

This specific example of the acoustic data acquisition/playback system 10 of FIG. 2B allows storage and real time retrieval of at least 2.5 minutes of 20 megahertz (MHz) RF data stream from the summing node of a Hewlett-Packard SONOS 5500 ultrasound imaging system. A portion (approximately 2.5 seconds) of this data can be archived and/or transported to another reviewing system using the nonvolatile removable storage drive 68.

A detailed block diagram of an example of a possible specific implementation of the acoustic data interface 72 (FIG. 2B) is illustrated in FIG. 2C. With reference to FIG. 2C, the acoustic data interface 72 generally includes a buffer/translator 82 and a multiplexor (MUX) 84. The buffer/translator 82 receives acoustic data 25 from the beamformer 24 (FIG. 2A), buffers the acoustic data, and translates the acoustic data into a suitable format, or data structure, for storage by the acoustic data acquisition/playback system 10 (FIG. 2B). The MUX 84 receives acoustic data from the beamformer 24, as indicated by reference arrow 25b and playback acoustic data 73b from the PCI interface 74 (FIG. 2B). The MUX 84 communicates either the data 25b or the data 73b to the TGC's 27 (FIG. 2A), depending upon the status of a select signal 86. In this specific embodiment, the select signal is generated and communicated from the CPU 9 (FIG. 2A) to the MUX 84. With the foregoing architecture, the acoustic data interface 72 can acquire data and inject data very quickly, generally at the same data rate at which acoustic data is typically processed in the signal processing pipeline 13 (FIG. 1).

Figure 3:
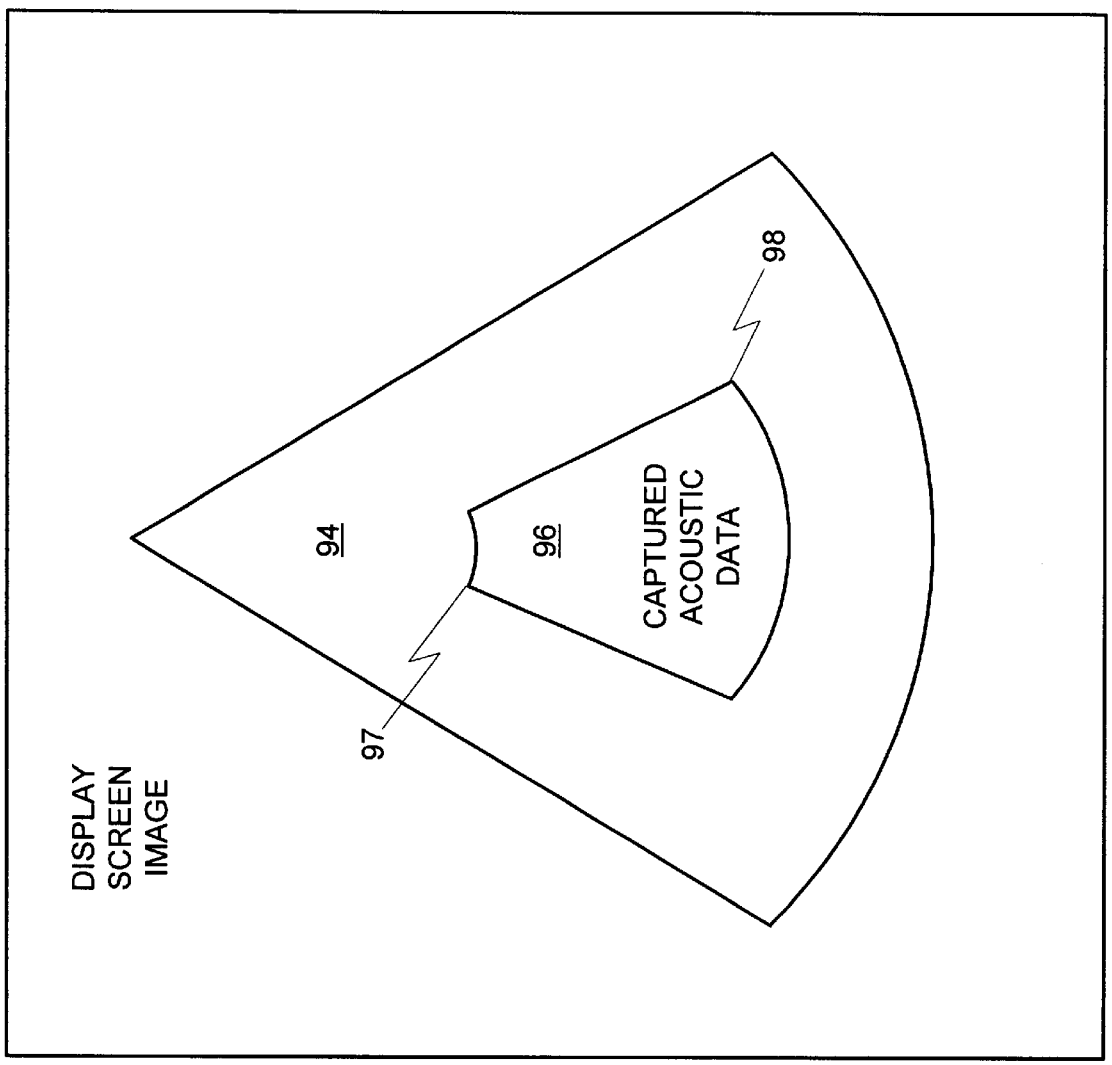
FIG. 3 is a schematic diagram of a display screen image on the display of FIGS. 1 and 2, which shows a window controlled by a user for advising the acoustic data acquisition/playback system on which acoustic data to capture.

The preferred methodology for allowing a user to define the acoustic data to be captured will now be described with reference to FIG. 3, which shows, schematically, a graphical user interface. As shown in FIG. 3, the display screen image 92 comprises a trapezoid-like ultrasound image 94 having a curved bottom boundary and skewed linear right and left sides, as shown. In this embodiment, the shape of the capturing window 96 is non-rectangular, that is, it has a curved top boundary, a curved bottom boundary, and generally linear skewed left and right sides as shown in FIG. 3, as the acoustic data at the point of capture will be in polar coordinates, and this geometric configuration is simple to implement and process. Almost needless to say, any geometric window shape is possible. As shown, the capturing window 96, which is smaller in size than the ultrasound image 94, is defined by a user over the ultrasound image 94 via any suitable inputs to one or more input mechanisms 71 (FIG. 2B). For example, the control software 66 (FIG. 2B) could be designed to prompt the user to move a mouse cursor to location 97 and either click a mouse button or depress a particular keyboard key and then do the same at location 98, in order to fully define the periphery and content of the 2D window 96. In this configuration, the control software 66 (FIG. 2B) is designed to recognize this window 96 and to parse out and capture only the enclosed acoustic data by advising the CPU 9 (FIG. 2A) when to assert and de-assert the select signal 86 (FIG. 2C) to the MUX 84 (FIG. 2C).

It should be emphasized that the above-described embodiments of the present invention, particularly, any "preferred" embodiment(s), are merely possible examples of implementations that are merely set forth for a clear understanding of the principles of the invention. Furthermore, many variations and modifications may be made to the above-described embodiments of the invention without departing substantially from the spirit and principles of the invention. All such modifications and variations are intended to be taught by the present disclosure, included within the scope of the present invention, and protected by the following claims.

Examples of alternative embodiments, which are variations of the preferred embodiment discussed hereinabove and which are intended to be protected by the claims, are described hereafter.

One species of alternative embodiments involves having the acoustic data acquisition/playback system 10 acquire data at a different stage of processing than is shown and described with respect to FIG. 2A. More specifically, as examples, the acoustic data acquisition/playback system 10 of FIG. 2A may be situated to and/or connected to acquire and/or inject data at connection 23 after the ADC's 22, or at connection 31 after the TGC's 27, or at connection 33 after the RF filter 28, or at connection 32 after the mixer 29, or at connection 36 after the amplitude detector 34, or after the log mechanism 38, or after the post-log filter 43, or after the acoustic memory 46, or after the scan converter 48. Furthermore, as previously mentioned, the order of some of these processing elements shown in FIG. 2A may be modified, as is known in the art, and it is possible to acquire data at one location and inject it into another different location, in the same machine or a different machine.

Another species of alternative embodiments involves having the acoustic data acquisition/playback system 10 acquire data at one stage of processing and injecting it into a different processing stage. More specifically, as an example, the acoustic data acquisition/playback system 10 of FIG. 2A may be situated to and/or connected to acquire data at connection 23 after the ADC's 22 and to inject data at connection 33 after the RF filter 28, or alternatively, acquire data at connection 32 after the mixer 29 and inject data after the log mechanism 38.

Yet another species of alternative embodiments involves acquiring the acoustic data from an ultrasound imaging system 11, processing it with a different signal processing system, for example, a computer system operating pursuant to suitable software, and then introducing the processed acoustic data, at the same point or at a different point in the processing pipeline 13, in the same acquiring system 11 or 15 in another reviewing system, which can permit review and further processing, if desired, of the acoustic data. More specifically, for instance, with reference to FIG. 1, acoustic data may be acquired after the beamformer 24 at connection 25 in system 11, then processed relative to the TGC function and the RF filter function in a different signal processing system, and then re-injected at connection 33 to the mixer 29 in the system 11. Many other alternative configurations along these lines are possible, as will be apparent to one with skill in the art.

Now, therefore, at least the following is claimed:

1. A method, comprising the steps of:
    (a) acquiring on a nonvolatile memory acoustic data that is from a signal processing pipeline associated with said ultrasound imaging system and that is acquired at a particular data rate during an image acquisition session wherein said acoustic data is produced by exposing a body to ultrasound signals;

(b) at a time after said image acquisition session:
 (1) introducing said acoustic data into a signal processing system from said nonvolatile memory at least at said particular data rate;
 (2) processing said acoustic data; and
 (3) producing an image from said processed acoustic data.

2. The method of claim 1, wherein said acoustic data is pre-existing and is acquired on a nonvolatile memory.

3. The method of claim 1, further comprising the step of storing said acoustic data on said nonvolatile memory during said image acquisition session.

4. The method of claim 1, further comprising the steps of, at a time after said image acquisition session:
 imposing a first processing parameter upon said acoustic data;
 producing a first image from said acoustic data based upon said first processing parameter;
 refraining from imposing said first processing parameter upon said acoustic data;
 imposing a second processing parameter upon said acoustic data; and producing a second image that is influenced by said second processing parameter, but not said first processing parameter.

5. The method of claim 1, wherein said acoustic data is acquired at a point along said signal processing pipeline after an analog-to-digital conversion and before conversion to video pixel data.

6. The method of claim 1, wherein the processing step comprises at least one step from the group consisting of:
 beamforming said acoustic data;
 filtering said acoustic data;
 mixing said acoustic data with another signal stream;
 implementing time gain control upon said acoustic data;
 nonlinearly translating said acoustic data; and
 linearly translating said acoustic data.

7. The method of claim 1, wherein said acoustic data that is stored on said nonvolatile memory comprises at least:
 a sample rate indicative of time between samples of said acoustic data;
 a start time for each frame of acoustic lines;
 a stop time for each frame; and
 for each sample of acoustic data, an amplitude value, a frame identifier, and an acoustic line identifier.

8. The method of claim 1, wherein said ultrasound imaging system and said signal processing system are the same system.

9. The method of claim 8, further comprising the step of re-introducing said acoustic data into said same system at a point that is different from where said acoustic data was acquired.

10. The method of claim 1, wherein said ultrasound imaging system and said signal processing system are separate noninterconnected systems.

11. The method of claim 1, further comprising the step of processing said acoustic data with a different signal processing system after said acquiring step but before said introducing, processing, and producing steps.

12. A system for enabling acquisition of acoustic data from an ultrasound imaging system and subsequent substantially real time playback of the acoustic data, comprising:
 acquisition means for acquiring said acoustic data at a particular rate from a signal processing pipeline associated with the ultrasound imaging system during an image acquisition session wherein said acoustic image is produced by exposing a body to ultrasound signals; and
 playback means for, at a time after said image acquisition session, re-introducing said acoustic data into a signal processing system at least at said particular rate, permitting processing of said acoustic data, and producing an image from said processed acoustic data.

13. The system of claim 12, further comprising:
 a nonvolatile memory means for storing said acoustic data;
 a buffer means for connecting an input to said nonvolatile memory, said buffer means for buffering and translating said acoustic data from one format to another; and a multiplexer means for connecting said nonvolatile memory to an output and for connecting said input to said output, said multiplexer means for connecting said nonvolatile memory to said output when a select signal of a first state is communicated to said multiplexer means and for connecting said input to said output when said select signal of a second state is communicated to said multiplexer means.

14. The system of claim 13, wherein said nonvolatile memory is removable from said system.

15. The system of claim 12, wherein said acoustic data, as stored in said nonvolatile memory, comprises at least:
 a sample rate indicative of time between samples of said acoustic data;
 a start time for each frame of acoustic lines;
 a stop time for each frame; and
 for each sample of acoustic data, an amplitude value, a frame identifier, and an acoustic line identifier.

16. A system for enabling acquisition of acoustic data from an ultrasound imaging system and subsequent substantially real time playback of the acoustic data, comprising:
 an ultrasound imaging system having a signal processing pipeline;
 an interface having an input and an output, said input being connected to said signal processing pipeline to receive acoustic data after an analog-to-digital conversion and before conversion to video pixel data, said output being connected to said signal processing pipeline to introduce said acoustic data after said analog-to-digital conversion and before conversion to video pixel data;
 a nonvolatile memory; and
 a controller in electrical communication with said interface and said nonvolatile memory, said controller designed to control said interface to acquire ultrasound samples via said input and store said samples in said nonvolatile memory, said controller designed to read said ultrasound samples from said nonvolatile memory and communicate said ultrasound samples to said output, said controller causing said acoustic data to be transferred out of said output at a rate that is at least that which said acoustic data was received at said input.

17. The system of claim 16, wherein said interface comprises:
 a buffer connecting said input to said nonvolatile memory, said buffer designed to buffer and translate said acoustic data from one format to another; and
 a multiplexer that can connect said nonvolatile memory to said output and that can connect said input to said output, said multiplexer having a select control for connecting said nonvolatile memory to said output when in a first state and for connecting said input to said output when in a second state.

18. The system of claim 16, wherein said controller is a processor programmed by a control software program.

19. The system of claim 16, wherein said nonvolatile memory is removable from said system.

20. The system of claim 16, wherein said acoustic data, as stored in said nonvolatile memory, comprises at least:

a sample rate indicative of time between samples of said acoustic data;

a start time for each frame of acoustic lines;

a stop time for each frame; and for each sample of acoustic data, an amplitude value, a frame identifier, and an acoustic line identifier.

* * * * *